(12) United States Patent
Blázquez Sánchez (10) Patent No.: US 12,247,867 B2
(45) Date of Patent: Mar. 11, 2025

(54) DEVICE AND METHOD FOR DETERMINING A FOCAL POSITION OF LASER BEAM

(71) Applicant: Precitec Gmbh & Co. KG, Gaggenau (DE)

(72) Inventor: David Blázquez Sánchez, Gaggenau (DE)

(73) Assignee: Precitec GmbH & Co. KG, Gaggenau (DE)

(*) Notice: Subject to any disclaimer, the term of this patent is extended or adjusted under 35 U.S.C. 154(b) by 373 days.

(21) Appl. No.: 17/602,323

(22) PCT Filed: Mar. 2, 2020

(86) PCT No.: PCT/EP2020/055416
§ 371 (c)(1),
(2) Date: Oct. 8, 2021

(87) PCT Pub. No.: WO2020/207662
PCT Pub. Date: Oct. 15, 2020

(65) Prior Publication Data
US 2022/0196468 A1 Jun. 23, 2022

(30) Foreign Application Priority Data

Apr. 12, 2019 (DE) .......................... 102019109795.9

(51) Int. Cl.
*B23K 26/70* (2014.01)
*B23K 26/046* (2014.01)
(Continued)

(52) U.S. Cl.
CPC ........... *G01J 1/0411* (2013.01); *B23K 26/046* (2013.01); *B23K 26/705* (2015.10); *G01J 1/4257* (2013.01); *G02B 26/08* (2013.01)

(58) Field of Classification Search
CPC ..... G01J 1/0411; G01J 1/4257; B23K 26/046; B23K 26/705; G02B 26/08
See application file for complete search history.

(56) References Cited

U.S. PATENT DOCUMENTS 6,713,718 B1  3/2004 Lu
9,511,450 B2 * 12/2016 Weick ................ B23K 26/0869
(Continued)

FOREIGN PATENT DOCUMENTS

CN    103476537 A    12/2013
CN    108025394 A     5/2018
(Continued)

OTHER PUBLICATIONS

International Search Report dated Aug. 18, 2020; International Application No. PCT/EP2020/055416.
(Continued)

*Primary Examiner* — Jonathan M Hansen
(74) *Attorney, Agent, or Firm* — DINSMORE & SHOHL LLP (57) ABSTRACT

A device for determining a focal position of a laser beam, in particular a processing laser beam in a laser processing head, has an optical decoupling element for decoupling a partial beam from a beam path of the laser beam, a detector for detecting at least one beam parameter of the partial beam, and at least one optical element with an adjustable focal length, which is arranged in a region of the beam path of the partial beam between the optical decoupling element and the detector. Also disclosed is a laser processing head which includes a device of this type, as well as a method for determining a focal position of a laser beam.

15 Claims, 5 Drawing Sheets

(51) Int. Cl.
*G01J 1/04* (2006.01)
*G01J 1/42* (2006.01)
*G02B 26/08* (2006.01)

(56) References Cited

U.S. PATENT DOCUMENTS

| | | | |
|---|---|---|---|
| 2010/0276403 A1* | 11/2010 | Reitemeyer | B23K 26/702 |
| | | | 219/121.67 |
| 2018/0029164 A1* | 2/2018 | Kramer | B23K 26/705 |
| 2018/0154481 A1* | 6/2018 | Valentin | G02B 27/30 |

FOREIGN PATENT DOCUMENTS

| | | |
|---|---|---|
| DE | 202012102794 U1 | 8/2012 |
| DE | 102013008774 B3 | 9/2014 |
| JP | H05-013857 A | 2/1975 |
| JP | 1996-309572 | 11/1996 |
| JP | 2006192461 A | 7/2006 |
| JP | 2009204691 A | 9/2009 |
| JP | 2013248656 A | 12/2013 |
| KR | 1020100090184 A | 8/2010 |
| KR | 1020170015866 A | 2/2017 |
| WO | 2017137022 A1 | 8/2017 |

OTHER PUBLICATIONS

Second Korean Office Action dated Jan. 30, 2024; application No. 10-2021-7036897.

* cited by examiner

Fig. 2

Set focal length of the optical element →

Fig. 5A

Set focal length of the optical element →

Fig. 5B

DEVICE AND METHOD FOR DETERMINING A FOCAL POSITION OF LASER BEAM

CROSS-REFERENCE TO RELATED APPLICATIONS

This application is the U.S. National Stage of PCT/EP2020/055416 filed Mar. 2, 2020, which claims priority to Germany Application No. 102019109795.9, filed Apr. 12, 2019, the entire content of both are incorporated herein by reference in their entirety.

BACKGROUND OF THE INVENTION

The present invention relates to a device for determining a focal position of a laser beam, in particular a machining laser beam in a laser machining head, and a method for determining a focal position of a laser beam. The invention also relates to a laser machining head comprising such a device. Such devices and methods may be used to determine and control the focal position in a laser machining head during laser material machining.

FIELD OF THE INVENTION

A problem in laser material machining is the so-called "thermal lens" (thermally induced change in refractive power) which is a result of the heating of optical elements for guiding and focusing the laser beam due to the laser power, in particular in the multi-kilowatt range, and the temperature dependence of the refractive index of optical glasses. During laser material machining, the thermal lens results in a focal shift along the direction of beam propagation, which has a negative effect when machining a workpiece. To ensure machining quality, it is therefore desired to monitor the focal position by measuring it. It is thus necessary to detect the respective focal position and to compensate for the focal position shift, i.e. to provide fast and precise focal position control.

BACKGROUND OF THE INVENTION

The thermal lens is caused by a thermal gradient along the radial direction of the optical components. Because of the radial laser power distribution, the temperature and thus the change in the refractive index is significantly greater in the center of the optics than at the edge. If only a fraction of the laser beam is measured, information about the thermal lens is lost and it is not possible to precisely determine its influence on the focal position. If the thermal lens is very pronounced, a spherical aberration is to be expected. The edge rays and the paraxial rays therefore do not meet in the same focus because of the different temperatures at the edge and in the center of the optical components. In addition, the share of power of marginal rays is less than that of the paraxial rays. If the focal position is only determined with the information from the marginal rays, then only a low level of measurement accuracy is to be expected. The thermal lens not only results in a focal shift, but also in deterioration of the beam quality due to imaging errors. This results in a change in the entire beam caustic including the focus diameter. The determination of the focal position via a comparison with reference values is therefore imprecise.

Various methods and devices for determining the focal position of a laser beam are known. The problem is the integration of these methods and devices into a laser machining head in order to ensure precise focal position measurement in real time during a laser material machining process.

The international standard ISO 11146 defines methods for measuring laser beams, in particular testing methods for laser beam parameters. In particular, it is specified how beam dimensions, for example beam widths or diameters, divergence angle, beam propagation factor, diffraction index and beam quality are to be measured. For determining the focal position, i.e. the position of the smallest diameter of the beam, the beam diameter is determined at at least ten points along the beam path. The change in the beam diameter is described mathematically with the so-called beam caustic as a function of the direction of beam propagation. By adapting the measured beam diameter to the beam caustic, the focal position as well as all other laser beam parameters can be determined.

According to DE 10 2015 106 618 B4, focal position control is carried out on the basis of the laser power using a corresponding characteristic map which describes the focal shift as a function of the laser power.

Using methods and devices that enable focal position control without measuring the actual focal position, an improvement in the machining quality can be achieved with minimal constructional effort, but high precision in the focal position control and therefore also high machining quality cannot be achieved.

DE 196 30 607 C1 describes a device for monitoring the energy of a laser beam. By tilting a window with respect to the axis of the laser beam, a portion of the laser beam is decoupled and directed onto a detector. The detector is arranged in an image plane of an optical system which images the laser beam onto a substrate and corresponds to the surface of the substrate.

In addition, particularly for laser cutting, laser machining heads with the largest possible autofocus range are preferred. However, the larger the autofocus range, the more difficult it is to provide a simple and compact focal position measurement. In other words, a larger autofocus range leads to a larger structural volume. For example, a laser machining head for laser cutting with an autofocus range of 50 mm requires a focal position measuring device that obtains a constant measurement resolution within this range.

SUMMARY OF THE INVENTION

It is therefore an object of the invention to provide a device for determining a focal position of a laser beam, in particular a machining laser beam of a laser machining head, preferably in real time, which can be implemented with minimal constructional effort and in a compact and simple manner or can be integrated into a laser machining head, and a laser machining head including the same. Another object of the invention is to provide a method for simply and precisely determining a focal position of a laser beam, in particular a machining laser beam of a laser machining head, preferably in real time.

This object is achieved by the device described herein, the laser machining head described herein and the method described herein. Advantageous embodiments are the subject matter of dependent claims.

The device according to the invention for determining a focal position of a laser beam, in particular a machining laser beam of a laser machining head, comprises, according to an embodiment: an optical decoupling element for decoupling a partial beam from a beam path of the laser beam, a detector for detecting at least one beam parameter of the partial beam, and at least one optical element which has adjustable focal length and is arranged in a beam path of the partial beam between the optical decoupling element and the detector.

The device preferably further comprises an evaluation unit configured to determine the focal position of the laser beam based on a plurality of values of the at least one detected beam parameter of the partial beam and corresponding associated values of the set focal length of the optical element.

By means of the optical element having adjustable or variable focal length in the beam path of the partial beam and the subsequently arranged detector, it is possible to detect the beam parameter along the direction of propagation of the partial beam or along the optical axis of the partial beam with focal lengths of the optical element set differently. For example, a corresponding value of the beam parameter of the partial beam may be determined for each set focal length of the optical element. In this way, for example, a beam caustic of the partial beam may be sampled or determined. Since the beam caustic of the decoupled partial beam corresponds to the beam caustic of the laser beam, the current or actual beam caustic of the laser beam can be determined on the basis of the beam caustic of the decoupled partial beam.

The evaluation unit may also be configured to determine a set focal length of the optical element at which the at least one detected beam parameter assumes a maximum or a minimum value. Based on the detected beam parameter and the corresponding set focal length of the optical element, the actual focal position of the laser beam, in particular of the machining laser beam, can be determined. For determining the focal position, preferably a set focal length of the optical element at which the beam parameter of the partial beam assumes an extreme value, e.g. at which the laser intensity of the partial beam assumes a maximum value and/or at which the beam diameter of the partial beam assumes a minimum value, may be determined. Based on this value for the set focal length, the focal position of the laser beam or the machining laser beam may finally be determined.

On the other hand, during a machining process it may be determined by means of the machining laser beam of the laser machining head whether the focal position of the laser beam has changed. For this purpose, the focal length of the optical element may be kept constant, i.e. may be fixedly set. At the beginning or before the start of the machining process, a desired focal position of the machining laser beam is set, e.g. on a workpiece to be machined, and a reference value of the beam parameter of the partial beam is determined by the detector. Here, the optical element having an adjustable focal length may be set such that the adjustable focal length is infinite or no refractive power is established. In the course of the machining process, the refractive power of an optical element of the laser machining head may change, in particular due to the phenomenon of the thermal lens, which results in a change in the focal position of the laser beam. This also leads to a change in the beam parameter of the partial beam detected by the detector. The change may be determined by comparing the beam parameter continuously detected by the detector with the previously measured reference value and is a measure of the change in the focal position of the partial beam. Thereby, a change in the focal position of the laser beam can be determined. Moreover, a difference between the current focal position and the focal position at the beginning of the machining process of the laser beam may be determined by comparing the beam parameter continuously detected by the detector with the previously determined reference value.

The evaluation unit may be configured to determine the focal position of the laser beam also based on at least one of the following values: orientation of the optical decoupling element, distance of the optical decoupling element to the detector, distance of the optical decoupling element to the focusing unit, distance of the optical decoupling element to the optical element having adjustable focal length, and distance of the optical element having adjustable focal length to the detector, where the distance here denotes the length of the path along the beam propagation direction of the decoupled partial beam.

The laser intensity may also be referred to as surface power density or "power density" for short. The surface power density may, for example, be specified using the unit "Watt per square meter".

In order to obtain a simple and structurally compact solution for precisely determining a focal position, preferably in real time, during the laser machining process, a partial beam is decoupled from the laser beam in a first step. In a second step, the focal position of the decoupled partial beam is determined using an optical element having adjustable focal length and a detector.

The optical element having adjustable focal length may be arranged stationary in the beam path of the partial beam, but at least stationary in the direction of beam propagation of the partial beam. According to an embodiment, the at least one optical element having a variable focal length is arranged in a stationary manner with respect to the direction of propagation of the partial beam. In other words, the position of the optical element along the direction of propagation of the partial beam may be fixed or set. The position of the detector may also be fixed or set or stationary along the direction of propagation of the partial beam. The detector is preferably arranged in the beam path of the partial beam such that the partial beam hits the detector after it has passed the optical element having adjustable focal length. In other words, the detector may be arranged in the beam path of the partial beam behind the optical element. The optical element having adjustable focal length may have an autofocus function.

The optical element having variable focal length makes it possible to determine the focal position of the laser beam or the beam caustic without moving the optical element having adjustable focal length or the detector along the direction of propagation of the partial beam or axially. This allows for a compact design of the device according to the invention. This also makes it possible to determine the focal position of the laser beam in real time since it is not necessary to move an element of the device by means of an actuator or motor. In addition, the device, and thus also the laser machining head including the same, can be constructed in a less complex and simpler manner since, for example, no guide elements are required for the displacement of elements.

Moreover, the device according to the invention may be used in laser machining heads with an autofocus function or in modular laser machining heads. For example, the device according to the invention may be used for laser machining heads with different focal lengths without great structural or constructive effort and influence. For example, the device according to the invention may be used both for a laser machining head with a focal length of 150 mm and for a laser machining head with a focal length of 200 mm. The difference in focal length may be compensated for by means of the optical element having an adjustable or variable focal length, for example by means of a liquid lens.

The detector may be configured to detect a laser intensity and/or beam diameter of the partial beam. According to an embodiment, the detector is configured to detect the laser intensity and/or the beam diameter of the partial beam at differently set focal lengths of the at least one optical element. The evaluation unit may be configured to determine a set value of the focal length of the optical element in accordance with a maximum laser intensity of the partial beam and/or in accordance with a minimum beam diameter of the partial beam.

For example, the detector is configured as a single-pixel sensor. This simplifies the evaluation of the signals or data generated by the detector. The detector may be a sensor that is not spatially resolving. In this case, a sensor surface of the detector is preferably smaller than a cross-sectional surface of the partial beam corresponding to the minimum beam diameter. In other words, a cross section of the sensor surface may be less than the beam diameter of the partial beam. The sensor surface of the detector may be arranged within the cross-sectional surface or within the beam diameter of the partial beam, and preferably the sensor surface is arranged on the optical axis of the partial beam.

The device may further include a diaphragm disposed between the optical element having adjustable focal length and the detector. The diaphragm is preferably arranged coaxially to or on the optical axis of the decoupled partial beam. The area of the diaphragm opening may be equal to or less than a cross-sectional area of the partial beam corresponding to the minimum beam diameter. This may ensure that the detector always determines a laser intensity of the partial beam that is dependent on the focal position of the partial beam or the focal position of the laser beam, even if no spatially resolving detector or a single-pixel sensor with a larger area is used.

In another example, an irradiance-sensitive photodetector, which may be a single-pixel sensor, may be used as the detector. With this type of photodetector, the sensor output is not only dependent on the total flow of the incident photons, but also on the size of the surface on which they are incident. This means that the signal of the sensor output varies along the beam propagation of the partial beam as the beam diameter varies. This allows for the irradiance to be measured. The irradiance reaches a maximum in focus along the direction of propagation. The laser intensity thus reaches a maximum where the beam diameter is smallest along the direction of propagation of the partial beam.

The irradiance sensitivity is a non-linear photosensitivity, as it is typical for many thin-film solar cell technologies, for example a Grätzel cell (also known as an electrochemical dye-sensitized solar cell). The electrochemical dye-sensitized solar cell does not use a semiconductor material to absorb light, but organic dyes. Compared to other semiconductor technologies (silicon, InGaAs, etc.), the charge transfer processes in these photodetector technologies lead to an irradiance-dependent sensitivity due to highly localized charge carriers and charge transfer processes.

The detector may also comprise a spatially resolving sensor, for example a multi-pixel sensor or a CCD camera. This allows for the beam diameter of the partial beam to be detected. In this case, the evaluation unit may be configured to determine the focal position based on a beam diameter detected by the sensor. The detector may also comprise a photodiode array. In this case, the number of pixels may be less than in case of a CCD camera. Thereby, the evaluation of the detector signal may be simplified.

The at least one optical element preferably has a continuous and/or arbitrarily adjustable or variable focal length. The focal length of the optical element may vary between −1 m and +1 m, for example.

The at least one optical element having adjustable focal length may comprise a deformable or formable optical element. For example, the optical element having variable focal length may comprise a deformable lens. An example of a deformable lens is a liquid lens. The refractive material may be a liquid. The refractive material may also be a deformable polymer. In this case the deformable lens is a polymer lens. Likewise, the optical element having variable focal length may comprise a deformable mirror. The deformable mirror may be, for example, a piezoelectrically deformable mirror or a MEMS-based ("microoptoelectromechanical adaptive") mirror. The deformable mirror may also be a mirror with a radius variable under pressure. Thus, according to the present invention, reflective deformable optical elements and transmissive deformable optical elements may be used as the at least one optical element having adjustable focal length.

The at least one optical element having variable focal length may comprise a plurality of optical elements that can be rotated relative to one another. For example, the optical element having variable focal length may comprise focusable Moiré lenses or a Moiré lens pair. These lenses may be focused over a wide range of focal lengths by rotation.

The at least one optical element having variable focal length may comprise one or more of the aforementioned elements or may comprise a combination of various of the aforementioned elements. For example, the at least one optical element having variable focal length may be configured as a lens group, one of the lenses in the lens group being a liquid lens.

The device may further comprise a control unit configured to adjust the focal length of the at least one optical element having adjustable focal length.

In other words, the control unit may be configured to control the focal length of the optical element. The control unit may be configured to set the focal length of the optical element continuously or discretely. In other words, the control unit may be configured to set different values for the focal length of the optical element. This makes it possible to measure or sample the beam caustic of the partial beam.

According to an embodiment, the at least one optical element having adjustable focal length may comprise a first optical element having adjustable focal length and a second optical element having adjustable focal length. The control unit may be configured to set the focal length of the first optical element independently of the focal length of the second optical element. The control unit may also be configured to set the focal length of the first optical element based on a target focal position of the laser beam of the laser machining system. This value for the focal length of the first optical element may subsequently be kept constant. The focal length of the second optical element may be varied, for example continuously, in order to detect different values for the at least one beam parameter.

In other words, the control unit may be configured to enable an imaging of an end of an optical fiber of the laser machining head on the detector of the device by setting the focal length of the first optical element. As a result, the device according to the invention may be adjusted to the set focal position of the laser beam, i.e. to the target value of the focal position, of the machining laser beam. This corresponds to presetting the device according to the invention in accordance with the set focal position or target focal position of the laser beam. The control unit may further be configured to change the focal length of the second optical element, for example continuously, such that, as shown above, the actual or current focal position of the laser beam, i.e. the actual value of the focal position, may be determined, for example, from the maximum of the laser intensity along the beam propagation direction.

The functionality of the control unit may also be carried out by the evaluation unit.

According to an embodiment, the optical decoupling element is configured to decouple the partial beam from the beam path of the laser beam by means of partial reflection. The optical decoupling element may be configured to be semitransparent for the laser beam. The decoupled partial beam may be the reflected or the transmitted portion of the incident laser beam. The optical decoupling element may be configured as a beam splitter, or it may comprise a beam splitter.

The optical decoupling element may be configured to decouple the partial beam with a direction of beam propagation that forms an angle greater than 0° and less than 180°, preferably greater than or equal to 90° and less than 180°, or between 45° and 135°, with a direction of beam propagation of the laser beam after passing through the optical decoupling element. The optical decoupling element may be arranged inclined relative to the direction of propagation of the laser beam. In other words, the optical decoupling element may be arranged oblique in the beam path of the machining laser beam or the optical decoupling element may be arranged oblique, tilted or inclined with respect to the optical axis.

The optical decoupling element is preferably configured such that the partial beam is decoupled over the entire cross-sectional area of the laser beam. As a result, in addition to the edge rays of the laser beam, the central rays of the laser beam are also decoupled and measured by the detector.

The optical decoupling element may comprise a protective glass and/or a mirror.

For example, the optical decoupling element comprises the last or one of the last transparent optical surfaces of a laser machining head, which is or are located in front of the workpiece to be machined in the direction of propagation of the machining laser beam. For example, the last protective glass of the laser machining head is arranged oblique or inclined to the optical axis of the laser machining head or to the direction of propagation of the machining laser beam.

When decoupling the partial beam, for example by means of a protective glass, a plurality of partial beams may be decoupled by reflection on different surfaces of the decoupling element. Here, the partial beam may also be referred to as a back reflection. According to the invention, only one decoupled partial beam is necessary or desired for being used to detect the at least one beam parameter. In order to prevent that a plurality of partial beams are decoupled or to prevent undesired decoupled partial beams from reaching the detector, the decoupling element, for example a protective glass, with a predetermined or increased thickness may be used so that the back reflections from the two sides of the protective glass can be reliably and simply spatially separated. As alternative measures for separating the additional back reflections, different coatings on the surfaces of the optical decoupling element or protective glass subsequently arranged along the optical axis are possible, or a wedge-shaped protective glass may be used as the decoupling element or a wedge may additionally be arranged in the beam path of the decoupled partial beam.

An alternative to decoupling a partial beam using protective glass is to deflect the machining laser beam using a semi-transparent mirror and to arrange the detector behind the mirror. The decoupling element may thus comprise a semi-transparent mirror, the detector being arranged on an extension of the optical axis of the machining laser beam before incidence on the mirror, but behind the mirror in the direction of beam propagation. In this case, the partial beam corresponds to the transmitted part of the laser light incident on the mirror, the reflected part of the laser light incident on the mirror being used as a machining laser beam for material machining.

The evaluation unit may be connected to the detector and the control unit. The evaluation unit may receive values of the laser intensity of the partial beam detected by the detector and/or detected values of the beam diameter of the partial beam. The evaluation unit may receive values set by the control unit for the focal length of the optical element. Based on the values obtained from the detector and the control unit, the evaluation unit may determine a beam caustic of the partial beam and/or may determine a maximum laser intensity of the partial beam and/or a minimum beam diameter of the partial beam. The evaluation unit may also determine the location of said maximum laser intensity and/or said minimum beam diameter in the direction of propagation of the partial beam or the set focal length of the optical element according to said maximum laser intensity or according to said minimum beam diameter.

The invention also relates to a laser machining head comprising a device according to the invention. According to an embodiment, the laser machining head is configured to generate a laser beam or a machining laser beam for laser material machining of a workpiece. According to the invention, the optical decoupling element is arranged in the beam path of the laser beam or the machining laser beam.

The laser machining head may further comprise a focusing unit for adjusting a focal position of the laser beam, for example with respect to a workpiece to be machined. The focusing unit may comprise one or more optical elements, such as, for example, a collimation optics or collimation lens or collimation lens group and/or a focusing optics or focusing lens or focusing lens group. The focusing unit, or at least one or more elements or parts of the focusing unit, may be displaceable along the direction of propagation of the laser beam. The laser machining head may further comprise a closed-loop control unit. The closed-loop control unit may be configured to adjust or move the focusing unit based on the focal position determined by the device. For example, the closed-loop control unit may compare the actual focal position determined by the device, in other words an actual value of the focal position, with a target value of the focal position and may adjust the focal position based on this comparison by adjusting the focusing unit. In other words, the closed-loop control unit is configured to use the focusing unit to control the focal position based on the actual or current focal position determined by the device. In this way, for example, a focus shift or an undesired change in the focal position of the laser beam due to the phenomenon of the thermal lens can be compensated for.

The closed-loop control unit may receive a value of the focal position determined by the device, i.e. an actual value of the focal position, of the machining laser beam from the device and may compare the determined value of the focal position with a target value of the focal position of the machining laser beam. Based on this comparison, the control unit may adjust or control the focal position of the machining laser beam.

The laser machining head according to the invention enables automatic control or tracking of the focal position of the machining laser beam. The laser machining head according to the invention enables continuous measurement and control of the focal position of the machining laser beam. In other words, it is possible to measure and control the focal position in real time.

The laser machining head may be a modular laser machining head or a laser machining head with an autofocus function, in particular a laser machining head with a large autofocus range of approximately 50 mm or more.

The optical decoupling element is preferably arranged in the portion of the laser beam that converges towards the focus. In other words, the optical decoupling element may be arranged behind the focusing unit in the direction of propagation of the laser beam in the convergent region of the beam path of the laser beam.

The evaluation unit of the device according to the invention may be arranged or integrated in the control unit of the device, in the detector of the device or in the closed-loop control unit of the laser machining head. The above-described function of the evaluation unit of the device may be carried out by the control unit of the device, by the detector of the device or by the closed-loop control unit of the laser machining head. For example, the closed-loop control unit of the laser machining head may be connected directly to the control unit of the optical element having variable focal length and the detector in order to receive the corresponding signals. The function of the evaluation unit may also be carried out jointly by a plurality of these elements.

The invention further relates to a method for determining a focal position of a laser beam, in particular a machining laser beam in a laser machining head. The method comprises the steps of: decoupling a partial beam from the laser beam, setting a focal length of at least one optical element having adjustable focal length and guiding the partial beam through the at least one optical element, detecting at least one beam parameter of the partial beam according to the set focal length, and determining the focal position of the laser beam based on the detected beam parameters and the set focal length. The focal position is preferably determined based on an extreme value, i.e. a minimum or maximum, of the detected beam parameter.

The method may further comprise the step of: repeating the steps of setting and detecting with at least one further set focal length of the optical element, the set second focal length differing from the set first focal length.

The device according to the invention may also be used in the method for determining a focal position of a laser beam described above.

BRIEF DESCRIPTION OF THE DRAWINGS

The invention is described in detail below with reference to figures. In the figures.

DETAILED DESCRIPTION OF THE INVENTION

Unless otherwise noted, the same reference symbols are used in the following for elements that are the equivalent and have equivalent effect.

Figure 1A:
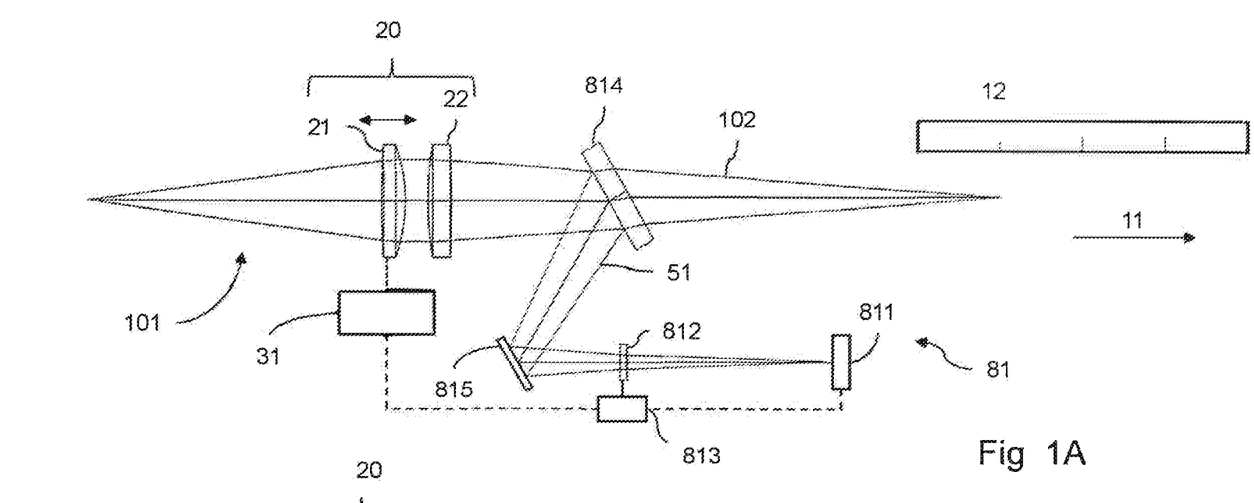
FIGS. 1A and 1B are schematic views of a laser machining head including a device for determining a focal position of a machining laser beam of the laser machining head according to an embodiment of the present invention at different focal positions of the machining laser beam.

FIG. 1A is a schematic view of a device for determining a focal position of a machining laser beam of a laser machining head and a laser machining head according to an embodiment of the present invention.

The laser machining head 101 is configured to generate a machining laser beam 102. The machining laser 102 is radiated onto a workpiece (not shown) in order to machine the workpiece. The machining laser beam 102 has a direction of propagation 11. The direction of propagation 11 may be substantially perpendicular to a surface of the workpiece to be machined.

The laser machining head 101 comprises a focusing unit 20. The focusing unit 20 is configured to set the focal position of the machining laser 102. As shown in FIG. 1A, the machining laser 102 has a first focal position 12. The focusing unit 20 comprises an element 21 which is displaceable along the direction of propagation 11, for example a collimation optics, and an element 22 which is stationary along the direction of propagation 11, for example a focusing optics. The optical elements 21 and 22 may be lenses. By moving the displaceable element 21 along the direction of propagation 11, the position of the focus of the laser beam 102 or the focal position thereof is set or changed.

The laser machining head 101 further comprises a closed-loop control unit 31. The closed-loop control unit is configured to set or control the focal position of the machining laser beam 102. For this purpose, the closed-loop control unit 31 may be connected to the focusing unit 20. The closed-loop control unit 31 may be connected to the displaceable element 21 of the focusing unit 20 in order to adjust the position of the displaceable element 21 along the direction of propagation 11 of the machining laser beam 102. In other words, the closed-loop control unit 31 may adjust the focusing unit 20 in order to adjust the focal position of the machining laser 102. The focusing unit 20, in particular the displaceable element 21, may thus be considered to be an actuator.

The device 81 for determining a focal position of the machining laser beam 102 of the laser machining head 101 comprises an optical decoupling element 814. The optical decoupling element 814 is configured to decouple a partial beam 51 from the machining laser beam 102. According to the embodiment shown in FIG. 1, the optical decoupling element 814 is a semi-transparent optical element. In this example, a portion of the laser light incident on the optical decoupling element 814 is decoupled as a partial beam 51.

According to the embodiment shown in FIG. 1A, the optical decoupling element 814 is one or the last transparent optical element along the direction of propagation 11 of the machining laser beam 102 before the machining laser beam 102 is incident on the workpiece to be machined. The optical decoupling element 814 may be, for example, a protective glass of the laser machining head 101. The optical decoupling element 814 is preferably arranged behind the focusing unit 20 along the direction of propagation 11, i.e. in the focused region of the beam path of the machining laser beam 102.

As shown, the optical decoupling element 814 is arranged inclined with respect to the direction of propagation 11 or the optical axis of the machining laser beam 102 in order to decouple the partial beam 51 from the beam path of the machining laser beam 102. This means that the machining laser beam 102 is incident on a surface of the optical decoupling element 814 at an angle that is not equal to 90 degrees.

According to the embodiment shown in FIG. 1A, the decoupled partial beam 51 is deflected or folded by a deflection element 815. This has the advantage that a spatially compact beam guidance of the partial beam 51 is made possible or that a spatially compact beam path of the partial beam 51 is created so that the device 81 can be made spatially compact. The deflection element 815 may be configured as a mirror, for example. The deflection element 815 is not required, however.

The device 81 further comprises an optical element 812 having adjustable or variable focal length. The optical element 812 is arranged in the beam path of the partial beam 51. In other words, the partial beam 51 is refracted or focused by the optical element 812. Therefore, the optical element 812 can change a focal position of the partial beam 51 by means of the adjustable focal length. According to the embodiment shown in FIG. 1, the optical element 812 has a continuously adjustable focal length and is configured as a deformable lens, for example a liquid or polymer lens. The focal length may be adjusted by deforming the optical element 812. The optical element 812 may, however, also comprise several Moiré lenses, at least one of which is mounted to be rotatable. Here, the focal length of the optical element 812 is adjusted by rotating the lenses relative to one another.

After decoupling from the laser beam 102, the partial beam 51 is thus possibly deflected by a deflection unit 815 and is then guided through the optical element 812 having adjustable focal length or passes through the optical element 812. Then, the partial beam 51 is incident on a detector 811 arranged behind the optical element 812 along the direction of propagation of the partial beam 51.

The device 81 may be configured such that, when the focal length of the optical element 812 is set to infinity (i.e., when the optical element 812 does not refract the partial beam 51), an optical path length of the machining laser beam between the focusing unit 20 (e.g., the stationary element 22 of the focusing unit 20) and the target focal position of the machining laser beam is equal to an optical path length of the partial beam 51 between the focusing unit 20 (e.g., the stationary element 22 of the focusing unit 20) and the detector 811. In this case, the detector is arranged in the focus of the partial beam 51. A deviation of the machining laser beam from the target focal position may be identified via a corresponding change in the beam parameter detected by the detector 811.

According to the embodiment shown in FIG. 1A, the detector 811 is a detector configured to detect a laser intensity or laser power density of the incident partial beam 51. For example, the detector 811 is configured as a photodiode or as an irradiance-sensitive photodetector. The detector 811 may also be configured to detect a diameter of the incident partial beam 51. In this case, the detector 811 may be configured as a spatially resolving detector, for example as a CCD camera or as a photodiode array.

Both the optical element 812 having variable focal length and the detector 811 are configured to be stationary with respect to the direction of propagation of the partial beam 51. This allows for a compact design of the device 81 since no elements that can be moved or displaced along the direction of propagation of the partial beam 51 are required.

The device 81 further comprises an evaluation unit 813. The evaluation unit 813 is connected to the optical element 812 and the detector 811.

The evaluation unit 813 is configured to set different focal lengths of the optical element 812. This function may also be carried out by a separate control unit (not shown). Furthermore, the evaluation unit 813 is configured to evaluate the laser intensity measured by the detector 811 or the measured beam diameter of the partial beam 51 for each set focal lengths of the optical element 812. In particular, the evaluation unit 813 may be configured to determine a value at which the laser intensity assumes a maximum value or the beam diameter of the partial beam 51 assumes a minimum value for the set focal length of the optical element 812 based on the various set focal lengths of the optical element 812 and the corresponding values for the laser intensity or the beam diameter of the partial beam 51 detected by the detector 812. Moreover, the evaluation unit 813 may determine a beam caustic of the partial beam 51. The evaluation unit 813 is configured to perform the aforementioned determination of the value of the set focal length of the optical element 812 according to a maximum value of the laser intensity or a minimum value of the beam diameter of the partial beam 51 continuously and/or in real time during laser material machining by the machining laser beam 102 of the laser machining head 101.

The evaluation unit 813 may use the value of the set focal length at which the laser intensity assumes a maximum value or the beam diameter of the partial beam 51 assumes a minimum value and determine, based on a distance between the optical decoupling element 814 and the detector 811 along the direction of beam propagation of the partial beam 51, the current focal position of the machining laser beam 102 in real time or continuously. The distance between the optical decoupling element 814 and the detector 811 along the direction of beam propagation of the partial beam 51 may be considered to be the optical path of the partial beam 51.

This makes it possible to always determine or establish the actual value of the focal position of the machining laser beam 102 in real time. It is thus possible to control the focal position of the machining laser beam 102 in real time and precisely.

For this purpose, the evaluation unit 813 may be connected to the control unit 31. The closed-loop control unit 31 receives the actual value or the determined value of the actual focal position of the machining laser beam 102 from the evaluation unit 813 and compares the received actual value with the set value or the target value for the focal position. If the comparison shows that the set target value deviates from the actual value, for example because of a shift in the focal position due to a thermal lens, the closed-loop control unit 31 controls the focusing unit 20 such that the focus or the focal position of the machining laser beam 102 is updated or the deviation is compensated for.

Figure 1B:
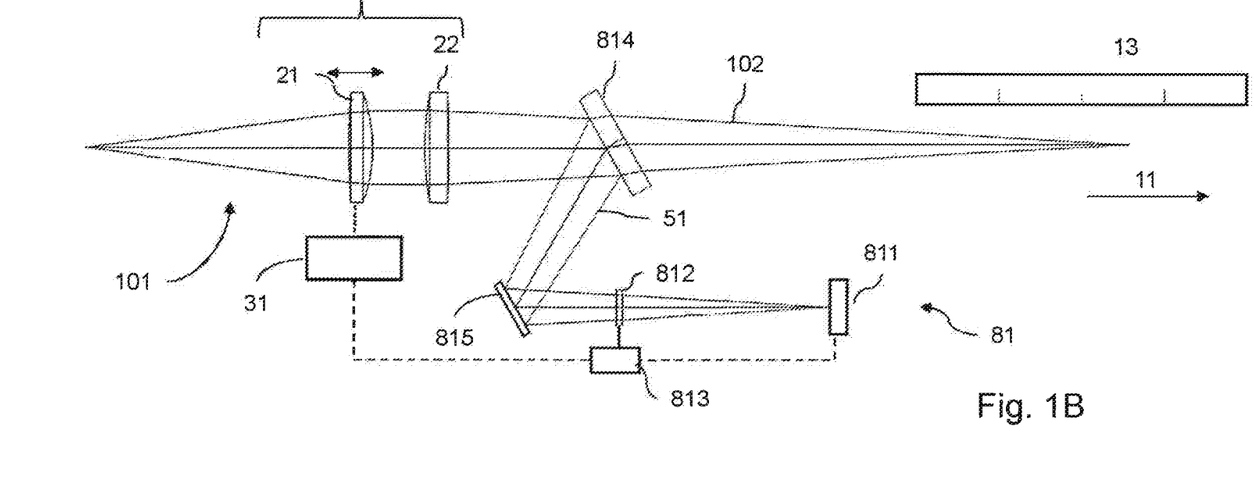

FIG. 1B shows the device 81 and the laser machining head 101 according to the embodiment shown in FIG. 1A with a set second focal position 13 of the machining laser beam 102.

Figure 2:
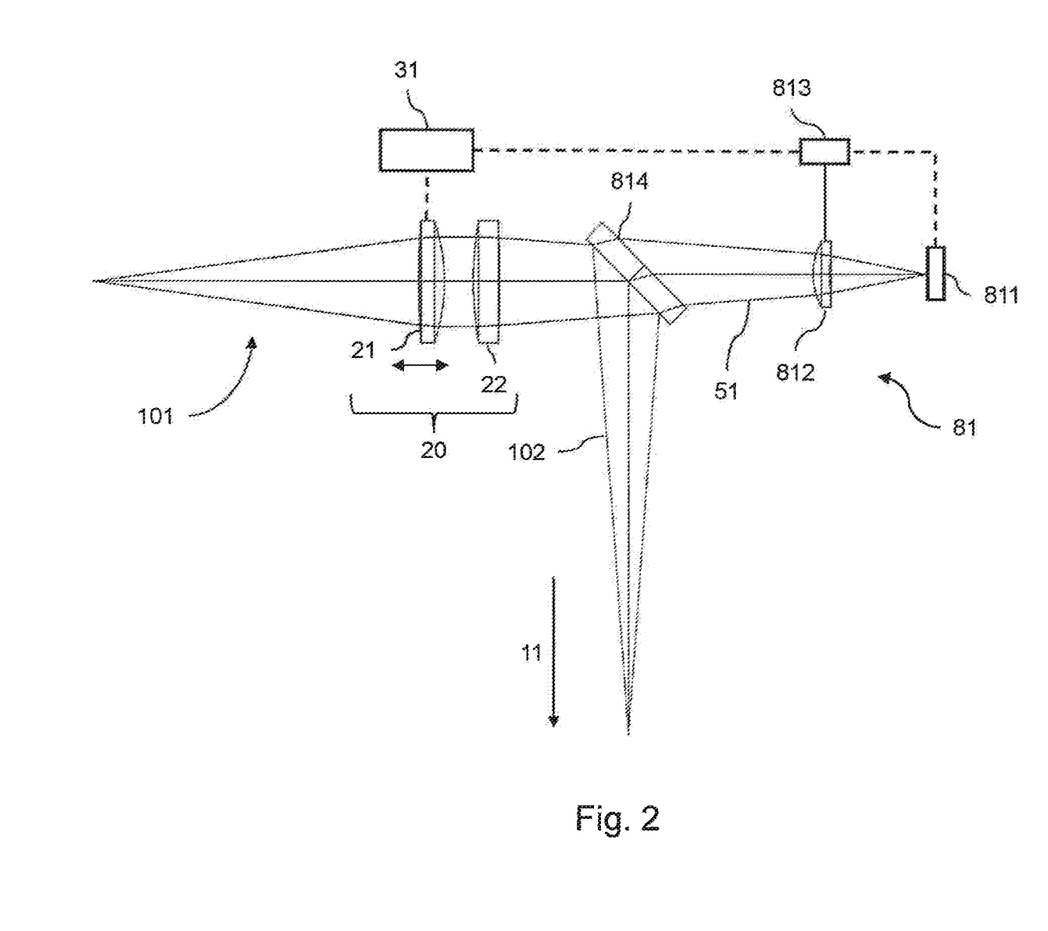
FIG. 2 shows a schematic view of a laser machining head including a device for determining a focal position of a machining laser beam of the laser machining head according to another embodiment of the present invention.

FIG. 2 shows a schematic view of a laser machining head including a device for determining a focal position of the machining laser beam according to another embodiment of the present invention. The embodiment of the present invention shown in FIG. 2 corresponds to the embodiment shown in FIGS. 1A and 1B, except for the differences described below.

The optical decoupling element 814 of the embodiment shown in FIG. 2 differs from the optical decoupling element 814 of the embodiment shown in FIGS. 1A and 1B in that the optical decoupling element comprises a mirror. The mirror is semi-transparent or semi-opaque. The mirror reflects a portion of the incident laser light as the machining laser beam 102. The non-reflected part of the incident laser light is decoupled as partial beam 51. In other words, the decoupled partial beam 51 is the transmitted part of the laser light incident on the mirror and the machining beam 102 is reflected by the mirror and directed onto a workpiece to be machined. According to the embodiment shown in FIG. 2, the device 81 does not include a deflection element. However, it is possible to also provide a deflection element 815, as shown in FIGS. 1A and 1B, in the device according to the embodiment shown in FIG. 2.

Figure 3A:
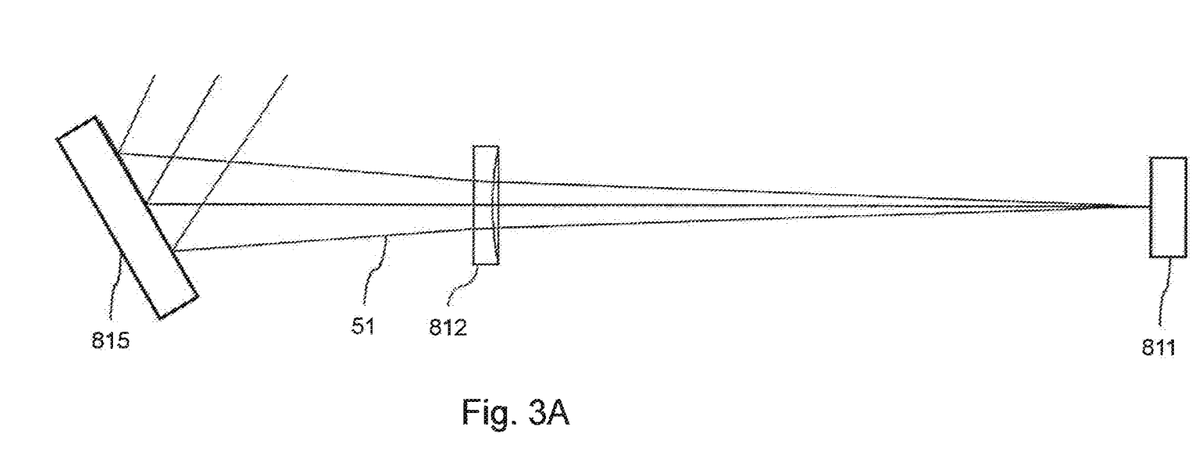
FIGS. 3A and 3B are schematic views of a section of the device for determining a focal position according to embodiments of the present invention.
Figure 3B:
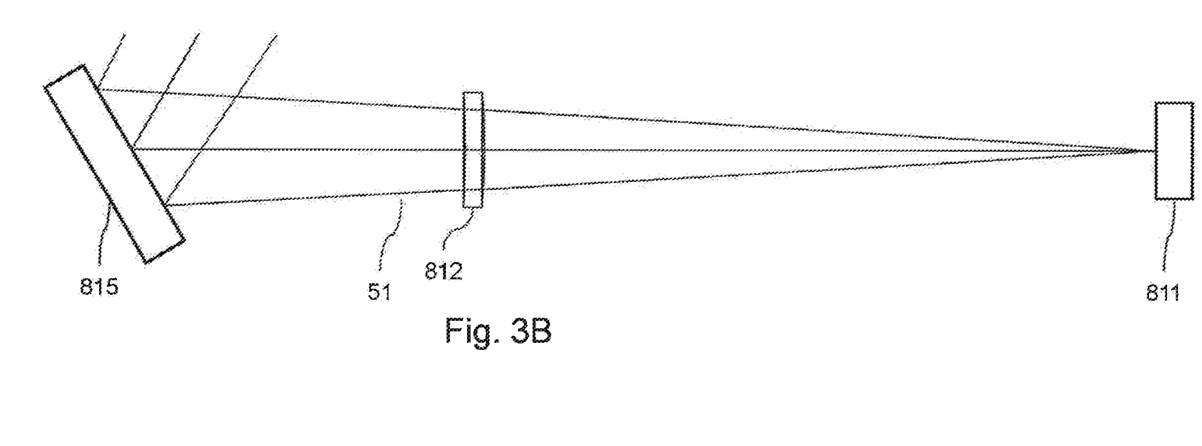

FIGS. 3A and 3B each show a schematic view of a section of the device of FIGS. 1A and 1B. FIGS. 3A and 3B each show the deflection unit 815, the optical element 812 and the detector 811, which are arranged one after the other in the beam path of the partial beam 51. In the state shown in FIG. 3A, the optical element 812 has a different set focal length than in the state shown in FIG. 3B. The respectively set focal lengths of the optical element 812 result in the partial beam 51 having a minimum beam diameter at the detector. The partial beam 51 may thus be focused on the detector 811 using the optical element 812 having adjustable focal length, regardless of the focal position of the machining laser beam 102. Here, the (known) distance between the decoupling element 814 and the detector 811 compared to the distance between the decoupling element 814 and the focal position 12 of the machining laser beam is essential. The beam diameter of the partial beam 51 or the laser intensity of the partial beam 51, which is/are detected by the detector 811, depends, on the one hand, on the set focal length of the optical element 812 and, on the other hand, on the setting of the focusing unit 20 of the laser machining head 101 and the phenomenon of the thermal lens, which may occur in the focusing unit 20, for example. Therefore, the partial beam 51 decoupled by the optical decoupling element in FIGS. 3A and 3B also has different beam diameters. However, the focal position 12 is determined based on the minimum beam diameter or the maximum intensity.

Figure 4A:
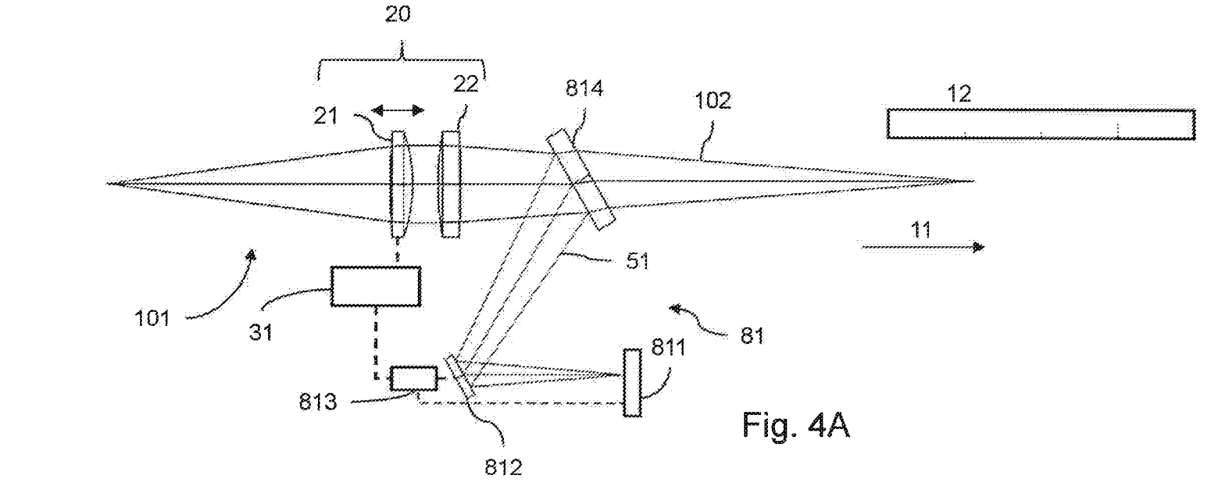
FIGS. 4A and 4B are schematic views of a laser machining head including a device for determining a focal position of a machining laser beam of the laser machining head according to a further embodiment of the present invention.
Figure 4B:
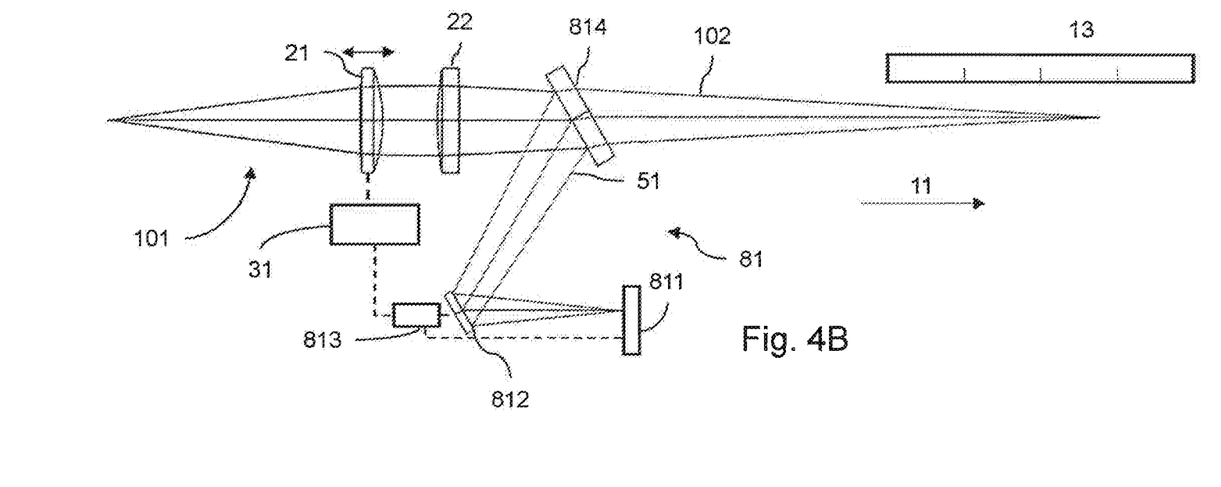

FIGS. 4A and 4B are schematic views of a laser machining head including a device for determining a focal position of the machining laser beam according to a further embodiment of the present invention. The further embodiment of the present invention shown in FIGS. 4A and 4B corresponds to the embodiment shown in FIGS. 1A and 1B, except for the differences described below.

In contrast to the transmissive optical element 812 having adjustable focal length according to the embodiment shown in FIGS. 1A and 1B, the optical element 812 having adjustable focal length according to the embodiment shown in FIGS. 4A and 4B comprises a reflective optical element such as a deformable mirror. The deformable mirror may be, for example, a piezoelectrically deformable mirror or a MEMS-based ("microoptoelectromechanical adaptive") mirror. The deformable mirror may also be a mirror with a radius variable under pressure. The focal length of the optical element 812 may be adjusted by the deformation of the optical element 812.

FIG. 4A shows the device 81 and the laser machining head at a set first focal position 12. FIG. 4B shows the device 81 and the laser machining head 101 according to the embodiment shown in FIG. 4A at a set second focal position 13 that is longer than the first focal position 12.

Figure 5A:
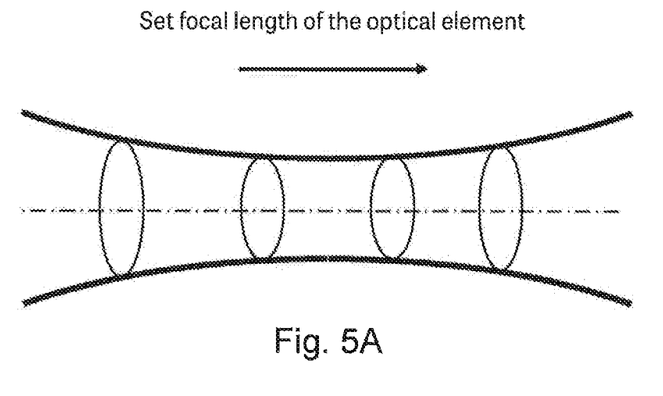
FIG. 5A is a diagram of a beam caustic determined by a device for determining a focal position according to embodiments of the present invention.
Figure 5B:
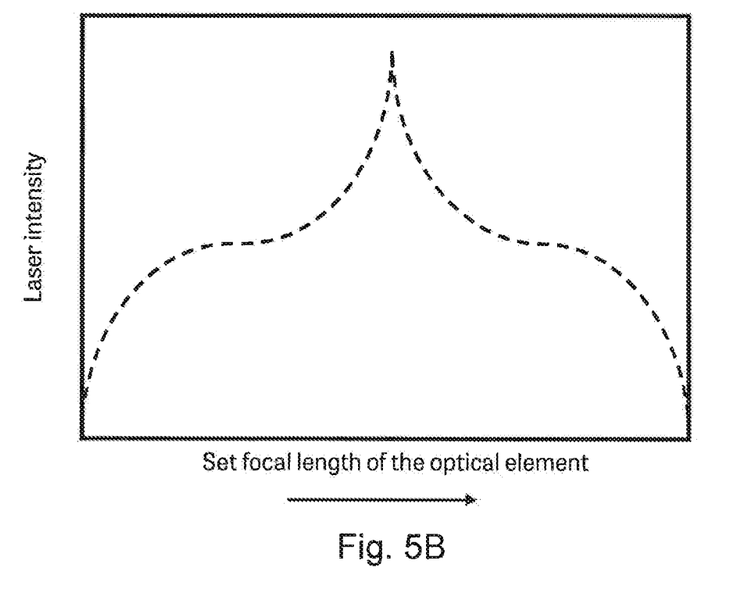
FIG. 5B is a graph of a laser intensity determined by a device for determining a focal position of a laser beam according to embodiments of the present invention.

FIG. 5A is a diagram of a beam caustic determined by a device 81 for determining a focal position in accordance with embodiments of the present invention. FIG. 5B is a graph of the laser intensity of the partial beam 51 along the direction of beam propagation thereof which was determined by a device 81 for determining a focal position of a laser beam according to embodiments of the present invention.

The change in beam diameter is described mathematically with the so-called beam caustic depending on the direction of propagation of the laser beam or the partial beam. FIG. 5A is an illustration of such a beam caustic of the partial beam 51 which was determined by a device for determining a focal position of a laser beam according to embodiments of the present invention.

According to the invention, the beam caustics of the partial beam 51 may also be obtained by detecting or measuring the respective values for the beam diameter of the partial beam 51 (corresponding to the circles in FIG. 5A) by means of the device 81 at different values for the set focal length of the optical element 812 by means of the detector 811. Using the determined beam diameter and a mathematical model, the beam caustic may be determined as the envelope in FIG. 5A in order to characterize the partial beam 51. However, an evaluation based on the extreme value of the beam parameter is simpler and faster.

According to the invention, as shown in FIG. 5B, the laser intensity of the partial beam 51 may be accordingly determined by the detector 811 as a function of the set focal length of the optical element 812. The laser intensity reaches a maximum for a focal length of the optical element 812 at which the diameter of the partial beam 51 is minimal.

According to the invention, the device for determining a focal position of a laser beam, in particular a machining laser beam of a laser machining head, uses an optical element having adjustable focal length and a detector, which are arranged one after the other in the direction of propagation of a partial beam decoupled from the laser beam. The detector is configured to detect a beam parameter, such as a laser intensity and/or a beam diameter, of the partial beam. An evaluation unit may also be provided in order to determine a set focal length of the optical element at which the laser intensity assumes a maximum value or at which the beam diameter assumes a minimum value. Based on the set focal length of the optical element, it is possible to determine a focal position of the laser beam. Since no elements have to be displaced to determine the focal position, a simple and compact design of the device is made possible. Furthermore, a precise real-time determination of the focal position is enabled and the determination of the focal position is independent of imaging errors caused by a change in a beam caustic of the laser beam or the partial beam, in particular a focus diameter, due to the phenomenon of the thermal lens.

LIST OF REFERENCE SYMBOLS

11 Direction of propagation of the machining laser beam
12 First focal position

13 Second focal position
101 Laser machining head
102 Machining laser beam
20 Focusing unit
21 Displaceable element
22 Stationary element
31 Closed-loop control unit
51 Decoupled partial beam
81 Device for determining a focal position of a machining laser beam
811 Detector
812 Optical element having adjustable focal length
813 Evaluation unit
814 Optical decoupling element
815 Deflection element

The invention claimed is:

1. A device for determining a focal position of a machining laser beam of a laser machining head, said device comprising:
    an optical decoupling element for decoupling a partial beam from a beam path of said machining laser beam before said machining laser beam is incident on a workpiece to be machined, the decoupling element being inclined with respect to the beam path of said machining laser beam;
    a detector for detecting at least one beam parameter of the partial beam;
    at least one optical element which has adjustable focal length and is arranged in a beam path of the decoupled partial beam between said optical decoupling element and said detector; and
    a control unit configured to set different focal lengths of said optical element,
    wherein said at least one optical element having adjustable focal length comprises a first optical element having adjustable focal length and a second optical element having adjustable focal length; and
    wherein said control unit is configured to set the focal length of the first optical element independently of the focal length of the second optical element.

2. The device according to claim 1, further comprising an evaluation unit configured to determine, based on different set focal lengths of said optical element and corresponding values of the at least one beam parameter of the partial beam, the focal position of said machining laser beam.

3. The device according to claim 2, wherein said detector is configured to detect values of the at least one beam parameter at the different set focal lengths of said at least one optical element, and wherein said evaluation unit is configured to determine a value of the set focal length of said optical element corresponding to an extreme value of the at least one beam parameter.

4. The device according to claim 1, wherein the at least one beam parameter of the partial beam comprises a laser intensity or a beam diameter of the partial beam.

5. The device according to claim 1, wherein said at least one optical element having adjustable focal length comprises a deformable optical element, a deformable lens, a deformable mirror, a MEMS-based deformable mirror, a piezoelectrically deformable mirror, a pressure-based deformable mirrors rotatable with respect to each other, or a Moiré lens pair.

6. The device according to claim 1, wherein said at least one optical element having adjustable focal length is arranged stationary with respect to a direction of propagation of the partial beam.

7. The device according to claim 1,
    wherein said control unit is configured to set the focal length of the first optical element based on a target focal position of said machining laser beam and to vary the focal length of said second optical element.

8. The device according to claim 1, wherein said optical decoupling element is configured to decouple the partial beam from the beam path of said machining laser beam by means of partial reflection, r or wherein said optical decoupling element is a protective glass or comprises a mirror.

9. The device according to claim 1, wherein said detector comprises a sensor that is not spatially resolving, a single-pixel sensor, an irradiance-sensitive photodetector, a photodiode array, or a CCD camera, or wherein a diaphragm is arranged between said detector and said optical element having adjustable focal length.

10. A laser machining head for machining a workpiece by means of a machining laser beam, comprising:
    a focusing unit for setting a focal position of said machining laser beam; and
    a device according to claim 1, wherein said optical decoupling element is arranged in the beam path of said machining laser beam.

11. The laser machining head according to claim 10, further comprising:
    a closed-loop control unit configured to control a focal position of said machining laser beam with respect to said workpiece by means of said focusing unit based on the focal position determined by said device.

12. The laser machining head according to claim 10, wherein said optical decoupling element is arranged in the part of said machining laser beam converging towards a focus or between said focusing unit and said workpiece or as a last optical element in the beam path of said machining laser beam before said workpiece or after all imaging or beam-shaping optical elements in the beam path of said machining laser beam.

13. A method for determining a focal position of a machining laser beam of a laser machining head, said method comprising the steps of:
    decoupling a partial beam from said machining laser beam before said machining laser beam is incident on a workpiece to be machined;
    setting a focal length of at least one optical element which has adjustable focal length and is arranged in a beam path of the decoupled partial beam;
    detecting at least one beam parameter of the partial beam corresponding to the set focal length after passing through said at least one optical element having adjustable focal length; and
    determining the focal position of said machining laser beam based on the detected beam parameters and the set focal length,
    wherein said at least one optical element having adjustable focal length comprises a first optical element having adjustable focal length and a second optical element having adjustable focal length; and
    wherein the focal length of the first optical element is set independently of the focal length of the second optical element.

14. The method according to claim 13, further comprising the step of:
    repeating the steps of setting and detecting with at least one further set focal length of said optical element, the set focal lengths being different from one another.

15. The method according to claim 13, wherein values of the at least one beam parameter are detected at different set focal lengths of said at least one optical element, and a value of the set focal length of said optical element is determined corresponding to an extreme value of the at least one beam parameter in order to determine the focal position based thereon.

* * * * *